United States Patent
Jackson et al.

(10) Patent No.: US 10,156,209 B2
(45) Date of Patent: Dec. 18, 2018

(54) PURGE VALVE LEAK DIAGNOSTIC ROBUSTNESS IMPROVEMENTS FOR SMALL TURBOCHARGED ENGINES

(71) Applicant: GM Global Technology Operations LLC, Detroit, MI (US)

(72) Inventors: Robert W. Jackson, Brighton, MI (US); John F. Van Gilder, Webberville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 345 days.

(21) Appl. No.: 15/008,792

(22) Filed: Jan. 28, 2016

(65) Prior Publication Data

US 2017/0218886 A1    Aug. 3, 2017

(51) Int. Cl.
| | | |
|---|---|---|
| *G01M 3/00* | (2006.01) | |
| *G01M 3/02* | (2006.01) | |
| *G01M 3/28* | (2006.01) | |
| *F02M 25/08* | (2006.01) | |

(52) U.S. Cl.
CPC ........ *F02M 25/0827* (2013.01); *G01M 3/025* (2013.01)

(58) Field of Classification Search
CPC ............................ F02M 25/0827; G01M 3/025
USPC .................... 73/40.5 R, 47; 123/520, 521
See application file for complete search history.

(56) References Cited

U.S. PATENT DOCUMENTS

| | | | | |
|---|---|---|---|---|
| 6,260,410 B1* | 7/2001 | Cook et al. | ........ | F02M 25/0809 73/114.39 |
| 6,321,727 B1* | 11/2001 | Reddy et al. | ...... | F02M 25/0809 123/520 |
| 8,122,758 B2* | 2/2012 | Wang et al. | ........ | F02M 25/0809 73/40 |
| 2013/0253799 A1* | 9/2013 | Peters et al. | ....... | F02M 25/0818 701/102 |
| 2014/0352658 A1* | 12/2014 | Jackson et al. | ........ | G01L 27/007 123/344 |

* cited by examiner

*Primary Examiner* — Lisa Caputo
*Assistant Examiner* — Roger Hernandez-Prewit (57) ABSTRACT

A system includes a diagnostic module that selectively performs a purge valve leak diagnostic to diagnose a leak in a purge valve in a fuel system of a vehicle. Performing the purge valve leak diagnostic includes determining a level of vacuum in a fuel tank. A control module determines at least one operating condition associated with the vehicle. The at least one operating condition corresponds to an operating condition that affects the level of vacuum in the fuel tank. The control module, based on the at least one operating condition, selectively modifies the purge valve leak diagnostic. Selectively modifying the purge valve leak diagnostic includes at least one of preventing the diagnostic module from performing the purge valve leak diagnostic, preventing the diagnostic module from completing the purge valve leak diagnostic, and causing the diagnostic module to indicate that a result of the purge valve leak diagnostic was indeterminate.

20 Claims, 4 Drawing Sheets

PURGE VALVE LEAK DIAGNOSTIC ROBUSTNESS IMPROVEMENTS FOR SMALL TURBOCHARGED ENGINES

FIELD

The present disclosure relates to fuel vapor control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust a mixture of air and fuel to generate torque. The fuel may be a combination of liquid fuel and vapor fuel. A fuel system supplies liquid fuel and vapor fuel to the engine. A fuel injector provides the engine with liquid fuel drawn from a fuel tank. A vapor purge system provides the engine with fuel vapor drawn from a vapor canister.

Liquid fuel is stored within the fuel tank. In some circumstances, the liquid fuel may vaporize and form fuel vapor. The vapor canister traps and stores the fuel vapor. The purge system includes a purge valve. Operation of the engine causes a vacuum (low pressure relative to atmospheric pressure) to form within an intake manifold of the engine. The vacuum within the intake manifold and selective actuation of the purge valve allows the fuel vapor to be drawn into the intake manifold and purge the fuel vapor from the vapor canister.

SUMMARY

A system includes a diagnostic module and a control module. The diagnostic module selectively performs a purge valve leak diagnostic to diagnose a leak in a purge valve in a fuel system of a vehicle. Performing the purge valve leak diagnostic includes determining a level of vacuum in a fuel tank. The control module determines at least one operating condition associated with the vehicle. The at least one operating condition corresponds to an operating condition that affects the level of vacuum in the fuel tank. The control module, based on the at least one operating condition, selectively modifies the purge valve leak diagnostic. Selectively modifying the purge valve leak diagnostic includes at least one of preventing the diagnostic module from performing the purge valve leak diagnostic, preventing the diagnostic module from completing the purge valve leak diagnostic, and causing the diagnostic module to indicate that a result of the purge valve leak diagnostic was indeterminate.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine combusts a mixture of air and fuel to produce torque. Fuel injectors may inject liquid fuel drawn from a fuel tank. Some conditions, such as heat, radiation, and fuel type may cause fuel to vaporize within the fuel tank. A vapor canister traps fuel vapor, and the fuel vapor may be provided from the vapor canister through a purge valve to the engine. In naturally aspirated engines, vacuum within an intake manifold may be used to draw fuel vapor from the vapor canister when the purge valve is open.

Various engine systems and methods may implement one or more procedures to diagnose a leak in the purge valve (e.g., a purge valve leak diagnostic). One example purge valve leak diagnostic is described in U.S. Pat. No. 8,122,758, which issued on Feb. 28, 2012, the entire disclosure of which is incorporated herein by reference. The present disclosure provides improved purge valve leak diagnostic systems and methods. In some examples, the improved purge valve leak diagnostic systems and methods are implemented in small turbocharged engine systems.

In an example purge valve leak diagnostic, the purge valve and a vent valve for venting the vapor canister are closed upon engine start. For example, the vent valve is actuated between open and closed positions using a solenoid, and may be open during a vehicle soak period prior to engine start. Accordingly, then the vent valve is closed upon engine start, an initial fuel tank pressure is approximately equivalent to ambient air pressure. The purge valve and the vent valve are maintained in the closed position for a predetermined (e.g., calibrated) period while the engine is running to measure an amount of vacuum that accumulates within the fuel tank. A measured amount of vacuum exceeding a threshold may be indicative of a purge valve leak. For example, if atmospheric conditions (e.g., the ambient air pressure) remain relatively constant, it can be assumed that accumulation of vacuum within the fuel tank was caused by a purge valve leak.

In some examples, a duration of the purge valve leak diagnostic may be based on one or more engine system parameters including, but not limited to, a fuel level in the fuel tank and engine load. For example, when the fuel level is relatively low, the vapor space (i.e., the unfilled portion of the fuel tank) is large (i.e., the vapor space is inversely proportional to the fuel level). Vacuum response of the vapor space is reduced when the fuel level is low (due to the increased amount of time required to accumulate vacuum in the vapor space), and more time is required to complete the purge valve leak diagnostic. Conversely, the vacuum response is increased when the fuel level is high, and less time is required to complete the purge valve leak diagnostic.

In some examples, operation of the purge valve leak diagnostic may also be affected by an amount of manifold vacuum (i.e., vacuum in an intake manifold of the engine system). For example, if engine load causes the manifold vacuum to increase above a threshold (e.g., due to boosted operation in a turbocharged engine), measurements performed by the purge valve leak diagnostic may be affected. Accordingly, the purge valve leak diagnostic may be adjusted (e.g., paused, extended, etc.) until the manifold vacuum decreases below the threshold. In some examples, if the manifold vacuum does not return below the threshold, a duration of the purge valve leak diagnostic may simply be extended according to the fuel level (e.g., to 30 seconds for a relatively low fuel level, and up to 60 seconds for a full fuel level).

In some operating conditions, vacuum can accumulate in the fuel tank when no purge valve leak condition is present. In an example situation, the vehicle may be parked (e.g., soaked) in a relatively warm ambient environment, such as a garage. Accordingly, the temperature may be greater than a temperature threshold required to perform the purge valve leak diagnostic (e.g., 4 degrees Celsius), while an outside ambient temperature (e.g., outside of the garage) is less than the temperature threshold. When the vehicle is driven outside of the garage, the ambient temperature (and therefore the fuel temperature) may decrease. A decrease in fuel temperature may cause condensation of the fuel vapor in the fuel tank (e.g., due to the volatility of certain fuel types and/or conditions, such as winter fuel).

Accordingly, the condensation of the fuel vapor may cause a measurable vacuum in the fuel tank regardless of whether a purge valve leak condition is present. Further, in some turbocharged engines, engine load will cause the manifold vacuum to increase above the threshold in most driving conditions (e.g., light acceleration, vehicle speeds greater than 50 mph, etc.) subsequent to driving the vehicle out of the garage (or other relatively warm ambient environment), delaying or extending the duration of the purge valve leak diagnostic as described above. The delay/extended duration may allow sufficient time for the fuel vapor condensation (caused by the transition from the relatively warm ambient temperature to the cooler outside ambient temperature) to accumulate a vacuum, causing the purge valve leak diagnostic to identify a purge valve leak condition regardless of whether a purge valve leak condition is actually present.

Purge valve leak diagnostic systems and methods according to the principles of the present disclosure improve the purge valve leak diagnostic to prevent the improper diagnosis of a purge valve leak condition.

Figure 1:
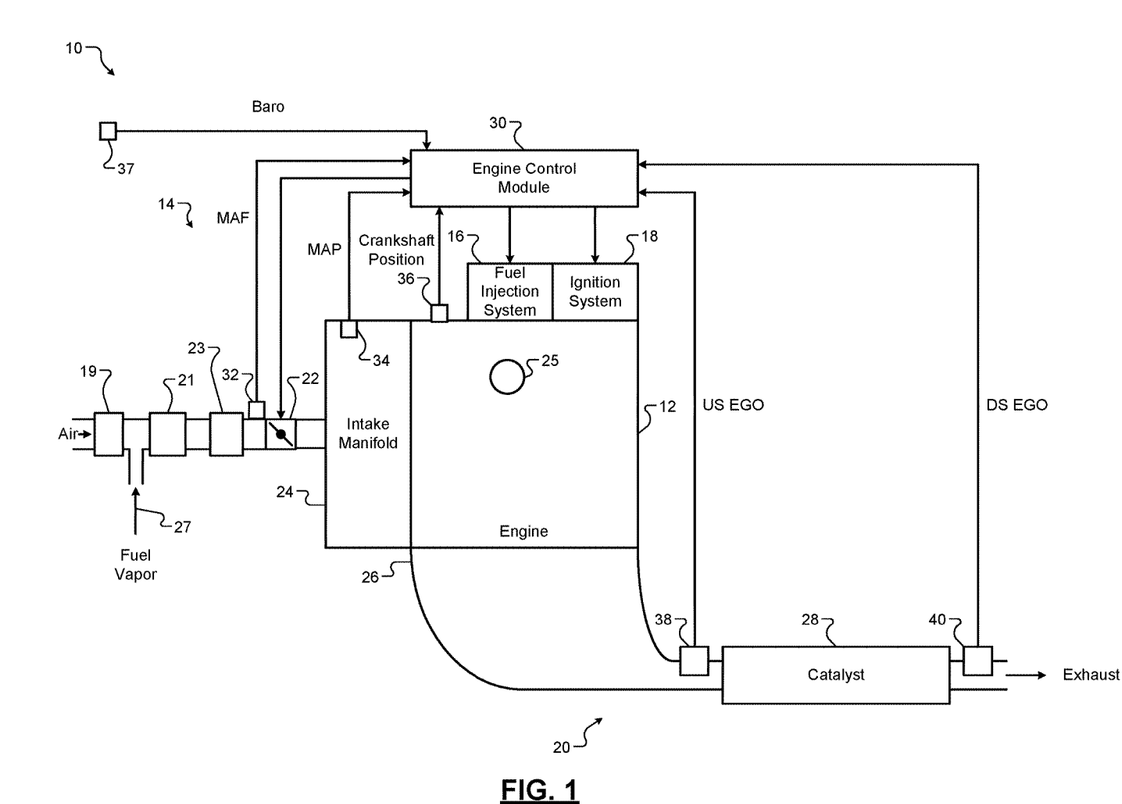
FIG. 1 is a functional block diagram of an example engine system according to the principles of the present disclosure.

Referring now to FIG. 1, a functional block diagram of an example engine system 10 is presented. The engine system 10 includes an engine 12, an intake system 14, a fuel injection system 16, a (spark) ignition system 18, and an exhaust system 20. While the engine system 10 is shown and will be described in terms of a gasoline engine, the present application is applicable to hybrid engine systems and other suitable types of engine systems having a fuel vapor purge system.

The intake system 14 may include an air filter 19, a turbocharger 21, a throttle valve 22, a charge cooler 23, and an intake manifold 24. The air filter 19 filters air flowing into the engine 12. While the example of one turbocharger is provided, more than one turbocharger may be included. The charge cooler 23 cools the gas output by the turbocharger 21.

The throttle valve 22 controls air flow into the intake manifold 24. Air flows from the intake manifold 24 into one or more cylinders within the engine 12, such as cylinder 25. While only the cylinder 25 is shown, the engine 12 may include more than one cylinder. The fuel injection system 16 includes a plurality of fuel injectors and controls (liquid) fuel injection for the engine 12. As discussed further below (e.g., see FIG. 2), fuel vapor 27 is also provided to the engine 12 under some circumstances. For example, the fuel vapor 27 may be introduced at a location between the air filter 19 and the turbocharger 21.

Exhaust resulting from combustion of the air/fuel mixture is expelled from the engine 12 to the exhaust system 20. The exhaust system 20 includes an exhaust manifold 26 and a catalyst 28. For example only, the catalyst 28 may include a three way catalyst (TWC) and/or another suitable type of catalyst. The catalyst 28 receives the exhaust output by the engine 12 and reacts with various components of the exhaust.

The engine system 10 also includes an engine control module (ECM) 30 that regulates operation of the engine system 10. The ECM 30 controls engine actuators, such as the turbocharger 21, the throttle valve 22, the intake system 14, the fuel injection system 16, and the ignition system 18. The ECM 30 also communicates with various sensors. For example only, the ECM 30 may communicate with a mass air flow (MAF) sensor 32, a manifold air pressure (MAP) sensor 34, a crankshaft position sensor 36, and other sensors.

The MAF sensor 32 measures a mass flowrate of air flowing through the throttle valve 22 and generates a MAF signal based on the mass flowrate. The MAP sensor 34 measures a pressure within the intake manifold 24 and generates a MAP signal based on the pressure. In some implementations, vacuum within the intake manifold 24 may be measured relative to ambient (barometric) pressure.

The crankshaft position sensor 36 monitors rotation of a crankshaft (not shown) of the engine 12 and generates a crankshaft position signal based on the rotation of the crankshaft. The crankshaft position signal may be used to determine an engine speed (e.g., in revolutions per minute). A barometric pressure sensor 37 measures barometric air pressure and generates a barometric air pressure signal based on the barometric air pressure. While the barometric pressure sensor 37 is illustrated as being separate from the intake system 14, the barometric pressure sensor 37 may be measured within the intake system 14, such as between the air filter 19 and the turbocharger 21 or upstream of the air filter 19.

The ECM 30 also communicates with exhaust gas oxygen (EGO) sensors associated with the exhaust system 20. For example only, the ECM 30 communicates with an upstream EGO sensor (US EGO sensor) 38 and a downstream EGO sensor (DS EGO sensor) 40. The US EGO sensor 38 is located upstream of the catalyst 28, and the DS EGO sensor 40 is located downstream of the catalyst 28. The US EGO sensor 38 may be located, for example, at a confluence point of exhaust runners (not shown) of the exhaust manifold 26 or at another suitable location.

The US and DS EGO sensors 38 and 40 measure amounts of oxygen in the exhaust at their respective locations and generate EGO signals based on the amounts of oxygen. For example only, the US EGO sensor 38 generates an upstream EGO (US EGO) signal based on the amount of oxygen upstream of the catalyst 28. The DS EGO sensor 40 generates a downstream EGO (DS EGO) signal based on the amount of oxygen downstream of the catalyst 28. The US and DS EGO sensors 38 and 40 may each include a switching EGO sensor, a universal EGO (UEGO) sensor (also referred to as a wide band or wide range EGO sensor), or another suitable type of EGO sensor. The ECM 30 may control the fuel injection system 16 based on measurements from the US and DS EGO sensors 38 and 40.

The engine control module 30 may implement the purge valve leak diagnostic systems and methods according to the principles of the present disclosure. For example, the engine control module 30 may include and/or communicate with a purge control module as described below in more detail in FIGS. 2 and 3.

Figure 2:
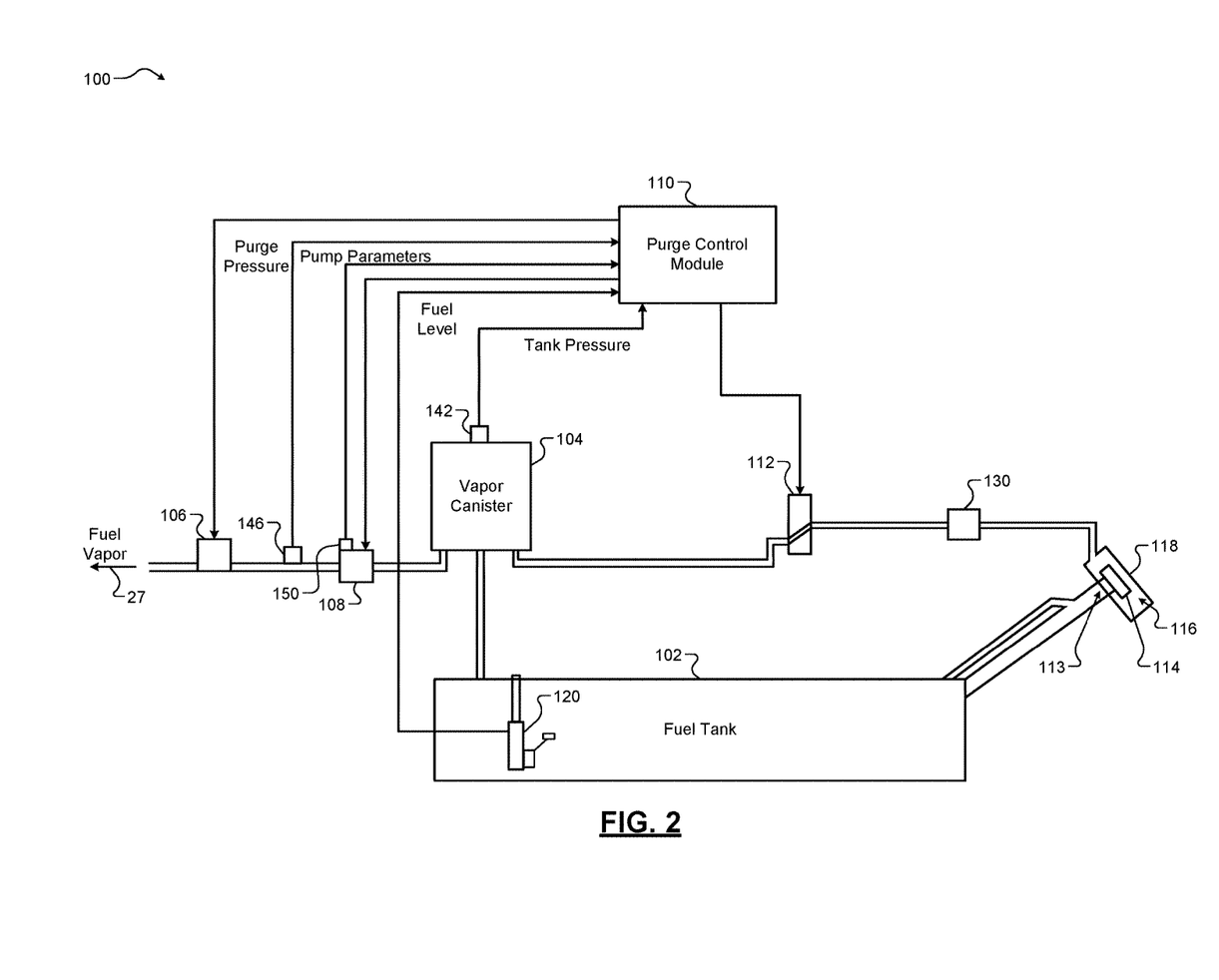
FIG. 2 is a functional block diagram of an example fuel control system according to the principles of the present disclosure.

Referring now to FIG. 2, a functional block diagram of an example fuel control system is presented. A fuel system 100 supplies liquid fuel and the fuel vapor to the engine 12. The fuel system 100 includes a fuel tank 102 that contains liquid fuel. One or more fuel pumps (not shown) draw liquid fuel from the fuel tank 102 and provide the fuel to the fuel injection system 16.

Some conditions, such as heat, vibration, and radiation, may cause liquid fuel within the fuel tank 102 to vaporize. A vapor canister 104 traps and stores vaporized fuel (i.e., the fuel vapor 27). The vapor canister 104 may include one or more substances that trap and store fuel vapor, such as one or more types of charcoal.

A purge valve 106 may be opened to allow fuel vapor flow from the vapor canister 104 to the intake system 14. More specifically, a purge pump 108 pumps fuel vapor from the vapor canister 104 to the purge valve 106. The purge valve 106 may be opened to allow the pressurized fuel vapor from the purge pump 108 to flow to the intake system 14. A purge control module 110 controls the purge valve 106 and the purge pump 108 to control the flow of fuel vapor to the engine 12. While the purge control module 110 and the ECM 30 are shown and discussed as being independent modules, the ECM 30 may include the purge control module 110.

The purge control module 110 also controls a vent valve 112. The purge control module 110 may open the vent valve 112 to a vent position when the purge pump 108 is on to draw fresh air toward the vapor canister 104. Fresh air is drawn into the vapor canister 104 through the vent valve 112 as fuel vapor flows from the vapor canister 104. The purge control module 110 controls fuel vapor flow to the intake system 14 by controlling the purge pump 108 and opening and closing of the purge valve 106 while the vent valve 112 is in the vent position. The purge pump 108 allows fuel vapor to flow without the need for vacuum within the intake system 14.

A driver of the vehicle may add liquid fuel to the fuel tank 102 via a fuel inlet 113. A fuel cap 114 seals the fuel inlet 113. The fuel cap 114 and the fuel inlet 113 may be accessed via a fueling compartment 116. A fuel door 118 may be implemented to shield and close the fueling compartment 116.

A fuel level sensor 120 measures an amount of liquid fuel within the fuel tank 102. The fuel level sensor 120 generates a fuel level signal based on the amount of liquid fuel within the fuel tank 102. For example only, the amount of liquid fuel in the fuel tank 102 may be expressed as a volume, a percentage of a maximum volume of the fuel tank 102, or another suitable measure of the amount of fuel in the fuel tank 102.

The fresh air provided to the vapor canister 104 through the vent valve 112 may be drawn from the fueling compartment 116 in various implementations, although the vent valve 112 may draw fresh air from another suitable location. A filter 130 may be implemented to filter various particulate from the ambient air flowing to the vent valve 112. A tank pressure sensor 142 measures a tank pressure within the fuel tank 102. The tank pressure sensor 142 generates a tank pressure signal based on the tank pressure within the fuel tank 102.

A purge pressure sensor 146 measures a purge pressure at a location between the purge pump 108 and the purge valve 106. The purge pressure sensor 146 generates a purge pressure signal based on the purge pressure at the location between the purge pump 108 and the purge valve 106.

The purge pump 108 is an electrical pump and includes an electrical motor that drives the purge pump 108. The purge pump 108 is not a mechanical pump that is driven by a rotating component of the vehicle, such as the crankshaft of the engine. The purge pump 108 may be a fixed speed pump or a variable speed pump.

One or more pump sensors 150 measure operating parameters of the purge pump 108 and generate signals accordingly. For example, the pump sensors 150 include a pump speed sensor that measures a rotational speed of the purge pump 108 and generates a pump speed signal based on the speed of the purge pump 108. The pump sensors 150 may also include a pump current sensor, a pump voltage sensor, and/or a pump power sensor. The pump current sensor, the pump voltage sensor, and the pump power sensor measure current to the purge pump 108, voltage applied to the purge pump 108, and power consumption of the purge pump 108, respectively.

The purge control module 110 may implement purge valve leak diagnostic systems and methods according to the principles of the present disclosure. For example, the purge control module 110 may implement one or more additional criteria for performing the purge valve leak diagnostic to prevent improper detection of purge valve leak conditions.

For example, the purge valve leak diagnostic may be preferably performed for a predetermined duration (e.g., from 30 to 60 seconds, based on fuel tank level, etc.). In operating conditions that extend this duration (e.g., boosted operation causing the diagnostic to be paused, delayed, etc. as described above) while facilitating evaporation of fuel (e.g., transitioning the vehicle from a relatively warm environment to a relatively cool environment), vacuum may accumulate in the fuel tank 102 and cause the diagnostic to identify a purge valve leak condition that is not actually present. Accordingly, in operating conditions that extend the duration of the purge valve leak diagnostic, the purge control module 110 may selectively disable the purge valve leak diagnostic. For example, the purge control module 110 may disable the purge valve leak diagnostic when the operating conditions cause the duration to exceed a predetermined (e.g., calibrated) duration, or to exceed the predetermined duration by an offset (e.g., x seconds greater than the predetermine duration). Disabling the purge valve leak diagnostic may include, but is not limited to, setting a diagnostic status indicator to a value indicating that the diagnostic was indeterminate, preventing the diagnostic from setting the status indicator to a value indicating that the diagnostic failed or was completed, etc.

In another example, the purge control module 110 may selectively disable the purge valve leak diagnostic when the operating conditions indicate that vacuum may accumulate in the fuel tank (e.g., when the engine, and therefore the diagnostic, is initiated in a relatively warm environment such as a garage and the vehicle is then driven out of the garage into a relatively cool environment). In one example, the purge control module 110 may disable the purge valve leak diagnostic when a measured ambient temperature is less than a temperature threshold (e.g., 0 degrees Celsius). The threshold temperature may be less than a OBD2 compliance temperature. In another example, the purge control module 110 may disable the purge valve leak diagnostic when the measured ambient temperature is a predetermined offset (e.g., 5, 10, 20, etc. degrees Celsius) less than a vehicle soak temperature (e.g., the temperature measured in the relatively warm environment at engine startup).

In another example, the purge control module 110 may selectively disable (and/or reset) the purge valve leak diagnostic when the engine is operated under boost conditions for more than a predetermined period. For example, when a vacuum measured in the intake manifold is greater than a vacuum threshold (e.g., corresponding to a pressure less than a predetermined or calibrated threshold, such as 0 kPa) for more than the predetermined period (e.g., 45 seconds), the purge valve control module 110 may disable the purge valve leak diagnostic. To reset the purge valve leak diagnostic (e.g., reinitiate the diagnostic and reset any timers associated with the diagnostic), the purge control module 110 may open the vent valve 112 to purge the vacuum accumulated in the fuel tank 102. For example, the purge control module 110 may open the vent valve 112 for a predetermined vent period (e.g., 5 seconds), then close the vent valve 112 and reinitiate the purge valve leak diagnostic. In another example, the purge control module 110 may maintain the vent valve 112 in the open position until the boost conditions are no longer present (e.g., when vacuum measured in the intake manifold is greater than the vacuum threshold for a predetermined period).

The purge control module 110 may selectively re-enable the purge valve leak diagnostic (e.g., allow the purge valve leak diagnostic to complete to set a diagnostic indicator to a value indicating that the diagnostic passed or failed) subsequent to any disabling of the purge valve leak diagnostic. For example, the purge control module 110 may re-enable the purge valve leak diagnostic after a predetermined period and/or when one or more other conditions are satisfied (e.g., the vehicle has traveled a predetermined distance, the engine is restarted, the vacuum measured in the intake manifold is greater than the vacuum threshold for a predetermined period, etc.).

Figure 3:
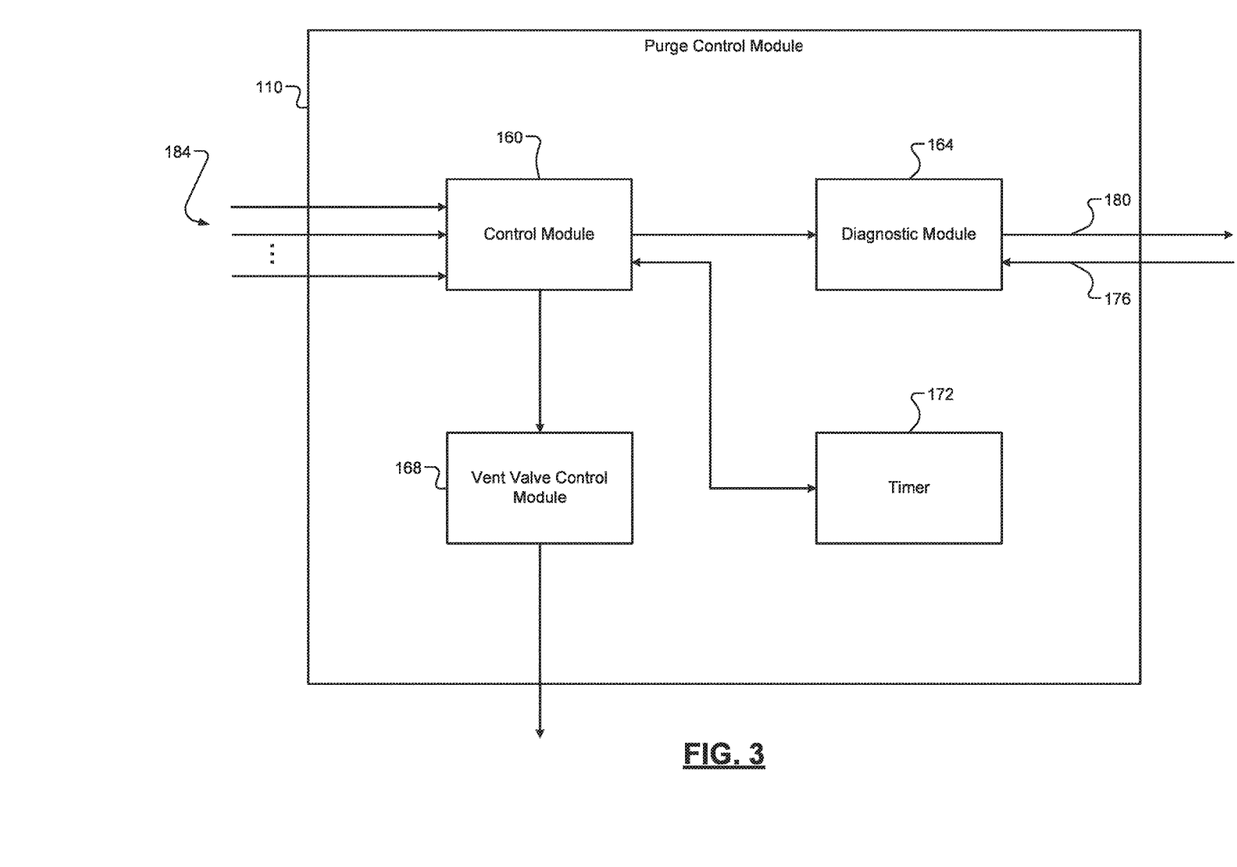
FIG. 3 is a functional block diagram of an example purge control module according to the principles of the present disclosure.

The purge control module 110 including example components for implementing purge valve leak diagnostic systems and methods is shown in more detail in FIG. 3. The purge control module 110 includes a control module 160, a diagnostic module 164, a vent valve control module 168, and a timer 172. The diagnostic module 164 executes the purge valve leak diagnostic to determine whether a purge valve leak condition is present. For example, the diagnostic module 164 may receive one or more signals 176 (e.g., from corresponding sensors) representing measurements of various vehicle conditions that may be indicative of a purge valve leak. For example, the signals 176 may correspond to measurements levels of a vacuum in the fuel tank 102, ambient temperatures, fuel temperatures, etc. The diagnostic module 164 provides a purge valve leak diagnostic status indicator 180 according to the purge valve leak diagnostic. For example, the indicator 180 may include a value indicating that the diagnostic passed, failed, was incomplete or indeterminate, was delayed, paused, etc. An engine system may perform one or more actions based on the indicator (e.g., activate a check engine or other indicator if the purge valve leak diagnostic failed).

The control module 160 communicates with the diagnostic module 164 to selectively enable, disable, reset, etc. the purge valve leak diagnostic. For example, the control module 160 receives one or more signals 184 (e.g., from respective sensors). For example, the signals 184 may indicate vehicle conditions including, but not limited to, a measured vacuum in an intake manifold, ambient temperature (sampled at engine startup, subsequent to engine startup, etc.), various predetermined or calibrated thresholds, etc. The control module 160 may also communicate with the timer 172, which increments a value indicative of a duration that the purge valve leak diagnostic has been running. The control module 160 receives the value from the timer 172, selectively resets the timer 172, etc. The control module 160 selectively enables, disables, and resets the purge valve leak diagnostic based on the signals 184 as described above in FIGS. 1 and 2. In some operating conditions, the control module 160 also selectively provides a control signal to the vent valve control module 168 to open and close the vent valve 112 to vent the vacuum in the fuel tank 102 as described above.

Figure 4:
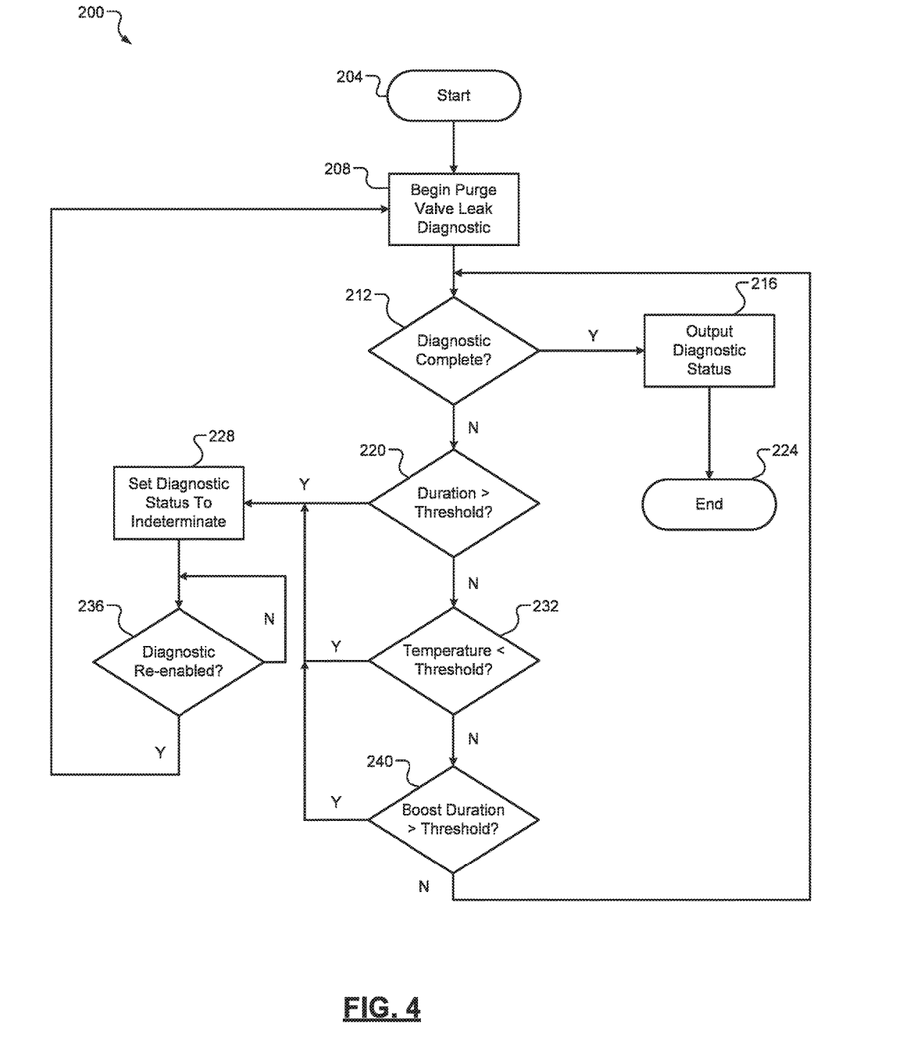
FIG. 4 is an example purge valve leak diagnostic method according to the principles of the present disclosure.

Referring now, an example purge valve leak diagnostic method 200 according to the principles of the present disclosure begins at 204. At 208, the method 200 begins a purge valve leak diagnostic. For example, the diagnostic module 164 begins the purge valve leak diagnostic at engine startup if one or more purge valve leak diagnostic criteria are met (e.g., ambient temperature above a threshold). At 212, the method 200 (e.g., the control module 160 and/or the diagnostic module 164) determines whether the diagnostic is complete. If true, the method 200 continues to 216. If false, the method 200 continues to 220. At 216, the method 200 (e.g., the diagnostic module 164) outputs a purge valve leak diagnostic status indicator and ends at 224.

At 220, the method 200 (e.g., the control module 160) determines whether a duration of the purge valve leak diagnostic is greater than a predetermined threshold. If true, the method 200 continues to 228. If false, the method 200 continues to 232. At 228, the method 200 (e.g., the control module 160) disables the purge valve leak diagnostic and sets the status indicator to a value indicating that the diagnostic was indeterminate (e.g., incomplete, delayed, etc.). At 236, the method 200 (e.g., the control module 160) determines whether to re-enable the purge valve leak diagnostic. If true, the method 200 continues to 208. If false, the method 200 continues to 236.

At 232, the method 200 (e.g., the control module 160) determines whether the ambient temperature is less than a threshold. If true, the method 200 continues to 228. If false, the method 200 continues to 240. At 240, the method 200 (e.g., the control module 160) determines whether a boost duration is greater than a threshold. If true, the method 200 continues to 228. If false, the method 200 continues to 212.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a diagnostic module that selectively performs a purge valve leak diagnostic to diagnose a leak in a purge valve in a fuel system of a vehicle, wherein performing the purge valve leak diagnostic includes determining a level of vacuum in a fuel tank; and
a control module that determines at least one operating condition associated with the vehicle, wherein the at least one operating condition corresponds to an operating condition that affects the level of vacuum in the fuel tank, and that, based on the at least one operating condition, selectively modifies the purge valve leak diagnostic, wherein selectively modifying the purge valve leak diagnostic includes at least one of (i) preventing the diagnostic module from performing the purge valve leak diagnostic, (ii) preventing the diagnostic module from setting a status indicator to a value indicating that the purge valve leak diagnostic was completed, and (iii) causing the diagnostic module to indicate that a result of the purge valve leak diagnostic was indeterminate.

2. The system of claim 1, wherein the at least one operating condition is a duration of the purge valve leak diagnostic, and the control module selectively modifies the purge valve leak diagnostic if the duration is greater than a predetermined period.

3. The system of claim 1, wherein the at least one operating condition is an ambient temperature, and the control module selectively modifies the purge valve leak diagnostic if the ambient temperature is less than a predetermined threshold.

4. The system of claim 1, wherein the at least one operating condition is a difference between (i) a first ambient temperature when the purge valve leak diagnostic began and (ii) a second ambient temperature less than the first ambient temperature, wherein the second ambient temperature is less than the first ambient temperature, and wherein the control module selectively modifies the purge valve leak diagnostic if the difference is greater than a predetermined threshold.

5. The system of claim 1, wherein the at least one operating condition is indicative of turbocharged operation of the vehicle.

6. The system of claim 5, wherein the at least one operating condition corresponds to a level of vacuum in an intake manifold of the vehicle.

7. The system of claim 6, wherein the at least one operating condition is a measured pressure in the intake manifold of the vehicle, and the control module selectively modifies the purge valve leak diagnostic if the measured pressure is less than a predetermined threshold.

8. The system of claim 7, wherein the control module selectively modifies the purge valve leak diagnostic if the measured pressure is less than a predetermined threshold for a duration that is greater than a predetermined period.

9. The system of claim 8, wherein the control module opens a vent valve to vent the fuel tank if the measured pressure is less than the predetermined threshold for a duration that is greater than the predetermined period.

10. The system of claim 9, wherein the control module closes the vent valve and selectively resets the purge valve leak diagnostic a predetermined period subsequent to opening the vent valve.

11. A method comprising:
selectively performing a purge valve leak diagnostic to diagnose a leak in a purge valve in a fuel system of a vehicle, wherein performing the purge valve leak diagnostic includes determining a level of vacuum in a fuel tank;
determining at least one operating condition associated with the vehicle, wherein the at least one operating condition corresponds to an operating condition that affects the level of vacuum in the fuel tank; and
based on the at least one operating condition, selectively modifying the purge valve leak diagnostic, wherein selectively modifying the purge valve leak diagnostic includes at least one of (i) preventing the purge valve leak diagnostic from being performed, (ii) preventing the purge valve leak diagnostic from setting a status indicator to a value indicating that the purge valve leak diagnostic was completed, and (iii) indicating that a result of the purge valve leak diagnostic was indeterminate.

12. The method of claim 11, wherein the at least one operating condition is a duration of the purge valve leak diagnostic, and wherein selectively modifying the purge valve leak diagnostic includes modifying the purge valve leak diagnostic if the duration is greater than a predetermined period.

13. The method of claim 11, wherein the at least one operating condition is an ambient temperature, and wherein selectively modifying the purge valve leak diagnostic includes modifying the purge valve leak diagnostic if the ambient temperature is less than a predetermined threshold.

14. The method of claim 11, wherein the at least one operating condition is a difference between (i) a first ambient temperature when the purge valve leak diagnostic began and (ii) a second ambient temperature less than the first ambient temperature, wherein the second ambient temperature is less than the first ambient temperature, and wherein selectively modifying the purge valve leak diagnostic including modifying the purge valve leak diagnostic if the difference is greater than a predetermined threshold.

15. The method of claim 11, wherein the at least one operating condition is indicative of turbocharged operation of the vehicle.

16. The method of claim 15, wherein the at least one operating condition corresponds to a level of vacuum in an intake manifold of the vehicle.

17. The method of claim 16, wherein the at least one operating condition is a measured pressure in the intake manifold of the vehicle, and wherein selectively modifying the purge valve leak diagnostic includes modifying the purge valve leak diagnostic if the measured pressure is less than a predetermined threshold.

18. The method of claim 17, wherein selectively modifying the purge valve leak diagnostic includes modifying the purge valve leak diagnostic if the measured pressure is less than a predetermined threshold for a duration that is greater than a predetermined period.

19. The method of claim 18, further comprising opening a vent valve to vent the fuel tank if the measured pressure is less than the predetermined threshold for a duration that is greater than the predetermined period.

20. The method of claim 19, further comprising closing the vent valve and selectively resetting the purge valve leak diagnostic a predetermined period subsequent to opening the vent valve.

* * * * *